United States Patent Office 3,030,416
Patented Apr. 17, 1962

3,030,416
BETA-DIKETONES AND PREPARATION THEREOF
Johannes Donatus von Mikusch-Buchberg, Hamburg-Harburg, Germany, assignor, by mesne assignments, to Unilever Limited, London, England, a company of England
No Drawing. Filed Aug. 28, 1958, Ser. No. 757,676
Claims priority, application Great Britain Aug. 30, 1957
7 Claims. (Cl. 260—593)

The invention relates to ketones and provides new beta-diketones of the following general formula:

$$R.CH_2.CO.CHR^1.CO.CH_2.R^2$$

where R, $R^1$ and $R^2$ signify saturated or non-acetylenically unsaturated, branched or straight-chain acyclic hydrocarbon radicals containing from 1 to 21 carbon atoms. R, $R^1$ and $R^2$ are preferably identical but may be different.

According to the process of the invention diketones of the formula specified above are made by effecting condensation of acids of the formula $R.CH_2.COOH$ where R is as defined as above, or of anhydrides of such acids at temperatures within the range 150 to 220° C. in the presence of oxygen-containing boron compounds, any water or other undesired products liberated in the reaction being removed as formed, treating the reaction mixture so formed with a hydrolysing agent and separating the beta-diketones from the products of hydrolysis.

The formation of the diketones starting with carboxylic acids involves the removal of one molecule of carbon dioxide and two molecules of water from three molecules of carboxylic acid. Part of the acid and/or anhydride may be replaced as starting materials by a monoketone of the formula $RCH_2.CO.CH_2R^1$.

The catalysts are oxygen-containing boron compounds of an acid nature (that is, capable of forming esters or anhydrides by reaction with OH or COOH groups respectively) or capable of forming compounds of an acid nature during the reaction. They include: inorganic boron compounds such as boric oxide, boric acid, and salts of boric acid with weak or volatile bases such as zinc borate and ammonium pentaborate; and organic boron compounds such as esters of boric acid and mixed anhydrides of boric acid and organic acids, for example boric acid trimethyl ester, boric acid triethyl ester, boric acid mannitol ester, the mixed anhydride of boric acid and acetic acid and oxidising boron compounds such as the mixed anhydrides of boric acid and higher fatty acids. Borax and the perborates are less suitable.

The process may be carried out at normal or reduced pressure. The reaction mixture may be kept at the boiling temperature of the mixture and carboxylic acid distilling off may be condensed and returned to the reaction mixture after removal of water. Alternatively a solvent of appropriate boiling point may be used. The solvent, when used, is partly distilled off together with any water liberated, condensed, separated from the water and may be returned wholly or in part to the reaction mixture.

After completion of the condensation, the reaction mixture is treated with a hydrolysing agent, preferably hot water and the residue purified for instance by decantation and distillation.

The acids which can be used, either as such or in the form of their anhydrides, in the condensation include: unbranched paraffinic monocarboxylic acids, such as propionic, butyric, valeric, caproic, oenanthic, caprylic, capric, lauric, myristic, palmitic and stearic acids, branched paraffinic monocarboxylic acids such as pivalic and isocaproic acids and olefin monocarboxylic acids such as 4-hexenoic, oleic, linoleic and erucic acids. Acids with terminal unsaturation such as vinylacetic acid tend to undergo polymerisation unless suitable precautions are taken.

When making the products according to the invention acid anhydrides or a mixture of monoketones and acid anhydrides may be used as a starting material and boric oxide or boric acid as a catalyst. Acids may also be used as a starting material although the reaction proceeds somewhat more slowly than when acid anhydrides or a mixture of monoketones and acid anhydrides are used as a starting material. It is often preferred to use acids as a starting material for economic reasons.

When the hydrocarbon groups are unsaturated care should be taken to avoid polymerization as much as possible. Polymerization mostly occurs when the degree of unsaturation is too high. Thus fatty acids such as linolenic acid and fatty acids containing conjugated double bonds such as tung oil fatty acids or octadeca-9:11-dienoic acid are less suitable; however, mixtures of fatty acids containing not too high a proportion of such acids, for example, linseed oil fatty acids or fish oil fatty acids may be used with good results. Acids containing one double bond, such as oleic acid, or two non-conjugated double bonds, such as linoleic acid, may be used with excellent results. Mixtures containing a substantial amount of these fatty acids, such as the fatty acids derived from soyabean oil, cotton seed oil, groundnut oil, rapeseed oil or tall oil or the corresponding anhydrides are preferred as starting materials. The diketones are useful as intermediates in organic syntheses, and as plasticizers, cutting oils and the like, especially if they contain saturated hydrocarbon chains. They are useful as drying components in paints, varnishes, linoleum and similar products, if they contain doubly unsaturated hydrocarbon chains.

The products according to the invention, are according to their molecular weight, colourless crystalline solids or more or less viscous liquids with a colour varying from light yellow to brown.

The invention will now be illustrated by the following examples:

The products of most interest are those in which R, $R^1$ and $R^2$ are acylic hydrocarbon radicals containing 2 to 20 carbon atoms.

Example 1

1 mole of caproic acid anhydride (214.3 g.) was heated with 5% of boric oxide (10.7 g.) for 9 hours at a temperature of 200° C. and atmospheric pressure with gentle stirring by means of a stream of nitrogen. During this period 7.5 g. of carbon dioxide were evolved. Subsequently 52 g. of caproic acid were distilled from the mixture under reduced pressure. The residue was freed from boric oxide and other boron compounds formed during heating by washing it 6 times with hot water and then fractionally distilled. Besides some caproic acid a main fraction distilling at 175 to 178° C. under a pressure of 10.5 mm. was obtained. This was composed mainly of 7-butyl-trideca-6:8-dione, with the following properties:

| | |
|---|---:|
| Acid value | 0 |
| Saponification value | 208.5 |
| Carbonyl value | 210.5 |
| Molecular weight | 268 |
| Density at 25° C | 0.8825 |
| Refractive index at 25° C | 1.4480 |
| Molar refraction | 81.43 |

When treated with ferric chloride solution it showed the deep red colour characteristic for beta-diketones.

Example 2

A mixture of 132 g. of propionic acid anhydride and 8 parts of boric oxide was boiled under reflux for 5 hours at a temperature of 143 to 170° C. at atmospheric pressure, using a reaction vessel kept in an oil-bath heated to 165 to 210° C. and surmounted by a long fractionating column. During this treatment impure propionic acid was allowed to distill off and carbon dioxide and water were removed. The reaction mixture was then treated with hot water and boric oxide was removed by repeated washing with water. The reaction mixture was fractionally distilled under a pressure of 10 mm. In this way a fraction boiling at about 92° C. at that pressure and composed mainly of 4:methyl-hepta-3:5-dione was collected.

*Example 3*

A mixture of 200 g. of caprylic acid anhydride and 13 g. of boric oxide was heated at 205 to 210° C. and atmospheric pressure under nitrogen which was bubbled continuously through the reaction mixture, for 8 hours, in the course of which 6.8 g. of carbon dioxide was liberated.

Vacuum was then applied and 74.3 g. of caprylic acid was distilled off under 20 mm. pressure.

The residue amounting to 131.5 g. was hydrolyzed and freed from boric acid by boiling seven times with water.

The dried residue weighing 114.4 g. was fractionated under vacuum and yielded a further 51.5 g. of caprylic acid and 41.3 g. of a fraction composed mainly of 9-hexyl-heptadeca-8:10-dione, distilling at 173 to 180° C. under 1 mm. and having an acid value of 1.7 and a molecular weight of 350 (calculated value 352). The diketone showed a strong red colourisation with ferric chloride.

*Example 4*

A mixture of 150 g. oleic acid and 4.6 g. boric oxide was heated at a vacuum of below 1 mm. Hg for 20 hours to 200 to 210° C. using a reaction vessel surmounted by a fractionating-column. The column was heated so as to allow the water and carbon dioxide liberated (together 13.4 g.) to escape while the fatty material was allowed to return to the reaction mixture.

The crude product had an acid value of 30 and a saponification value of 105. It was boiled with water in order to hydrolyse organic boron compounds formed during the reaction and washed until all boric acid thus formed had been removed.

In order to remove free fatty acids contained in the product this was then heated in a distillation flask to 220° C. and held at this temperature for 20 minutes at 0.5 mm. Hg when about 12% of its weight distilled off.

The residue consisted mainly of the diketone 19-hexadec-7':8'-enyl - heptatriacont - 9:10, 28:29 - dien-18:20-dione and had an acid value of 5, a saponification value of 76 and a molecular weight of 789 (calculated mol. wt.=767.4).

*Example 5*

The process was carried out as in Example 4 but substituting stearic acid anhydride for oleic acid and carrying out the heating for 10 hours at 210° C.

In this way the diketone 19-hexadecyl-heptatriaconta-18:20-dione was obtained in good yield.

*Example 6*

The process was carried out as in Example 4 but substituting linoleic acid anhydride for oleic acid and carrying out the heating for 6 hours at 210° C.

In this way a moderate yield of the diketone 19-hexadec-7':8' - 10':11' - dienyl - heptatriacont - 6:7-9:10-28:29-31:32-tetraen-18:20-dione was obtained.

What is claimed is:

1. A process for preparing beta-diketones of the formula $RCH_2.CO.CHR^1.CO.CH_2R^2$, where $R$, $R^1$ and $R^2$ are non-acetylenic acyclic hydrocarbon radicals containing 1 to 21 carbon atoms, which comprises effecting condensation of a substance selected from the class consisting of acids of the formula $R.CH_2COOH$, where $R$ is as defined above and anhydrides of said acids at temperatures within the range 150 to 229° C. in the presence of boric oxide, any water liberated in the reaction being removed as formed, treating the reaction mixture so formed with a hydrolysing agent and separating the beta-diketone from the products of hydrolysis.

2. A process according to claim 1, wherein the initial reaction mixture contains also a mono-ketone of the formula $RCH_2.CO.CH_2R^1$ where $R$ and $R^1$ are as defined above.

3. A process according to claim 1, wherein the treatment is carried out under reflux.

4. A process according to claim 1, wherein the treatment is carried out under super-atmospheric pressure in a current of inert gas.

5. A process according to claim 1, wherein the treatment is carried out under reduced pressure.

6. 19-hexadec - 7':8' - enyl - heptatriacont - 9:10-28:29-dien-18:20-dione.

7. 19-hexadec - 7':8' - 10':11' - dienyl - heptatriacont-6:7-9:10-28:29-31:32-tetraen-18:20-dione.

References Cited in the file of this patent

UNITED STATES PATENTS 2,223,932  Towne _____ Dec. 3, 1940
2,569,132  Melstrom et al. _____ Sept. 25, 1951

OTHER REFERENCES

Beilstein, vol. I (2nd supplement), p. 848 (1941).
Adams et al.: Organic Reactions, vol. VIII, p. 101 (1954).